United States Patent [19]
Werre

[11] Patent Number: 5,813,131
[45] Date of Patent: Sep. 29, 1998

[54] TELESCOPE MOUNTING ALIGNMENT BARS

[76] Inventor: John D. Werre, 3820 Foothill Rd., Kalispell, Mont. 59901

[21] Appl. No.: 538,279

[22] Filed: Oct. 2, 1995

[51] Int. Cl.$^6$ ..................................................... G01B 5/25
[52] U.S. Cl. ................................. 33/645; 33/245; 33/533
[58] Field of Search ........................... 33/245, 228, 246, 33/247, 252, 233, 533, 520, 613, 644, 645; 42/1.01, 90, 100, 101, 106

[56] References Cited

U.S. PATENT DOCUMENTS

| | | |
|---|---|---|
| 2,216,766 | 10/1940 | Cook . |
| 2,451,266 | 10/1948 | Whittemore ............................... 33/245 |
| 2,484,801 | 10/1949 | Anderson .................................. 33/644 |
| 2,517,268 | 8/1950 | Wilson . |
| 2,638,676 | 5/1953 | Callahan ................................... 33/645 |
| 2,924,881 | 2/1960 | Gee .......................................... 33/245 |
| 3,259,986 | 7/1966 | Carr ......................................... 33/245 |
| 3,711,955 | 1/1973 | Holt . |
| 3,764,219 | 10/1973 | Collines . |
| 4,233,748 | 11/1980 | Ford et al. . |
| 4,338,726 | 7/1982 | Swailes . |
| 4,790,079 | 12/1988 | Meyers . |
| 5,185,937 | 2/1993 | Piety et al. ............................... 33/645 |
| 5,222,306 | 6/1993 | Neumann ................................. 33/645 |
| 5,433,010 | 7/1995 | Bell ......................................... 33/246 |

*Primary Examiner*—Christopher W. Fulton
*Attorney, Agent, or Firm*—Harry M. Cross, Jr.

[57] ABSTRACT

The invention comprises a pair of telescopic sight mount aligning bars. Each bar comprises an elongated rod having a planar circular inner end bounded by a circular peripheral edge. The circular inner ends of the two bars are perpendicular to the longitudinal axis of their respective bars, and the inner ends of the two bars have substantially identical diameters and peripheral edges so that the two inner ends may be closely juxtaposed when used to align, and to check the alignment of, a telescopic sight mount. Consequently, a telescopic sight mount misalignment will be revealed by a misalignment of the peripheral edges relative to one another and also will be revealed by a non-parallelity between the two inner ends.

9 Claims, 4 Drawing Sheets

TELESCOPE MOUNTING ALIGNMENT BARS

BACKGROUND OF THE INVENTION

1. Field of the Invention

This invention relates to devices to align the mounting elements that mount a telescopic sight to a rifle or to a hand gun and to test the alignment of telescopic sight mounts.

2. Brief Description of the Prior Art

Several types of telescopic sight mounts are available to mount a telescopic sight to a rifle or to a hand gun. A common feature of some telescopic sight mounting devices is the provision of a pair of rings that clasp the telescope, fore and aft, and hold the telescope into proper position. These telescope-holding rings must be essentially perfectly aligned in parallel planes so that the longitudinal axis through the rings are coincident. If either ring is mis-aligned, either horizontally or vertically, the scope will be positioned in an incorrect attitude, and could be damaged cosmetically, structurally or optically.

To further complicate scope alignment, one of more of these rings may be provided with elevation and direction adjustability so that the attitude of the scope can be sighted in for different shooting distances and conditions. It is difficult to make such scope alignment adjustments and still keep the rings aligned. Furthermore, for some other types of scope mounting assemblies, the mounting assembly base may be adjustable for elevation and direction, the scope mounting rings for such mounting assemblies not having any provision for adjustability.

SUMMARY OF THE INVENTION

It is a primary object of the present invention to provide a means for testing the alignment of telescopic sight mounts. Another object is to provide such a means that may be used to align telescopic sight mounting rings and scope mounting ring bases employed to attach a telescopic sight to a rifle or to a hand gun. It is a further object to provide such a means with a facility to be used to test the alignment of, and to align, a variety of different scope-mounting ring and mounting ring base configurations.

The invention comprises a pair of telescopic sight mount aligning bars. Each bar comprises an elongated rod having a planar circular inner end bounded by a circular peripheral edge. The circular inner ends of the two bars are perpendicular to the longitudinal axis of their respective bars, and the inner ends of the two bars have substantially identical diameters and peripheral edges so that the two inner ends may be closely juxtaposed when used to align, and to check the alignment of, a telescopic sight mount. Consequently, a telescopic sight mount misalignment will be revealed by a misalignment of the peripheral edges relative to one another and also will be revealed by a non-parallelity between the two inner ends.

DESCRIPTION OF THE PREFERRED EMBODIMENT

Figure 1:
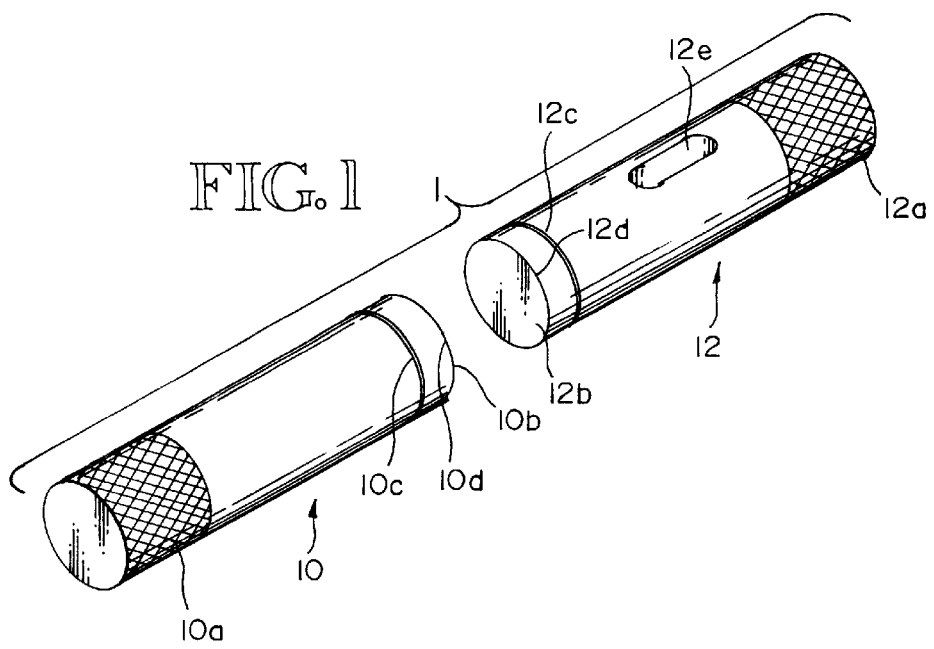
FIG. 1 is a perspective view of the scope aligning bars of this invention.

As shown in FIG. 1, the scope aligning bars 1 of this invention comprise two elongated cylindrical rods 10, 12 that are of substantially the same outer diameter and are of substantially equal length. Although the rods are herein referenced as "scope aligning bars " it is to be understood that the bars are equally useful to check or test the alignment of telescopic sight mounts. Thus, one may check the alignment of a telescopic sight mount, using the scope aligning bars of this invention. And, one may align telescopic sight mounts as hereinafter described. However, some telescopic sight mounts are incorrectly manufactured or damaged after manufacture, and the scope aligning bars of this invention are useful in testing the alignment of such mounts so that, if not properly manufactured, or if damaged so as to not be alignable, such mounts may be replaced or repaired if possible.

Each rod is provided with an outer end portion having an outer circumferential surface 10a, 12a that is knurled or otherwise roughened to provide a finger-gripping surface. Each rod is provided with an inner end portion having a substantially identical end surface, 10b, 12b that is aligned perpendicular to the longitudinal axis of the rod. For the purposes of the invention, it is important that the end surfaces 10b, 12b be substantially identical and circular; the rest of the surfaces of the rods 10 and 12 need not be identical—however, the identity of surfaces 10b, 12b can be most easily attained by making the entirety of rods 10 and 12 out of cylindrical stock having the same outer diameter all along the stock. Adjacent the inner end of each rod, an annular groove, 10c, 12c encircles the rod so as to demark an area between the knurled surface 10a, 12a and the inner end surface 10b, 12b; the purpose of which will be discussed hereinafter. One of the rods, such as rod 12, may be provided with an elongated slot 12e that extends diametrically through the rod, the elongation being in the direction of the longitudinal axis of the rod; the purpose of which will be discussed hereinafter.

Figure 2:
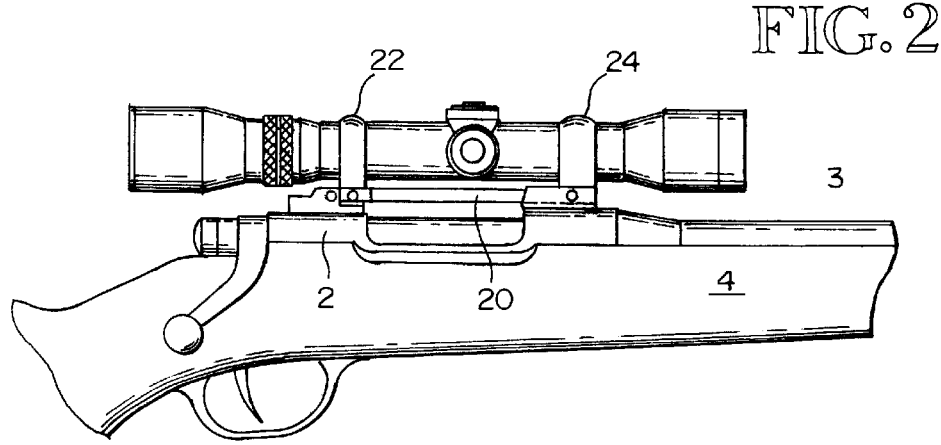
FIG. 2 is a side elevation view of one type of scope mounting assembly composed of a bridge-type ring-mounting base and a pair of scope-retaining rings, illustrating a telescopic sight mounted in the assembly.
Figure 3:
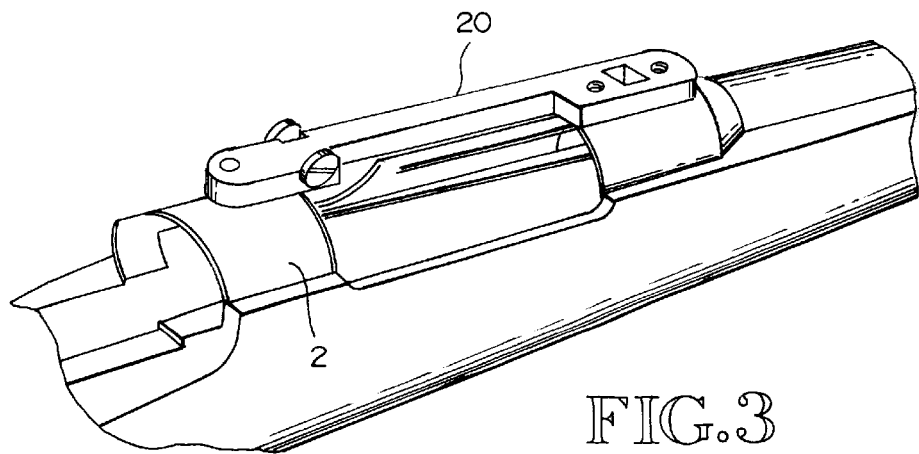
FIG. 3 is a perspective view of the FIG. 2 scope mounting assembly illustrating the assembly base attached to a rifle receiver.
Figure 6:
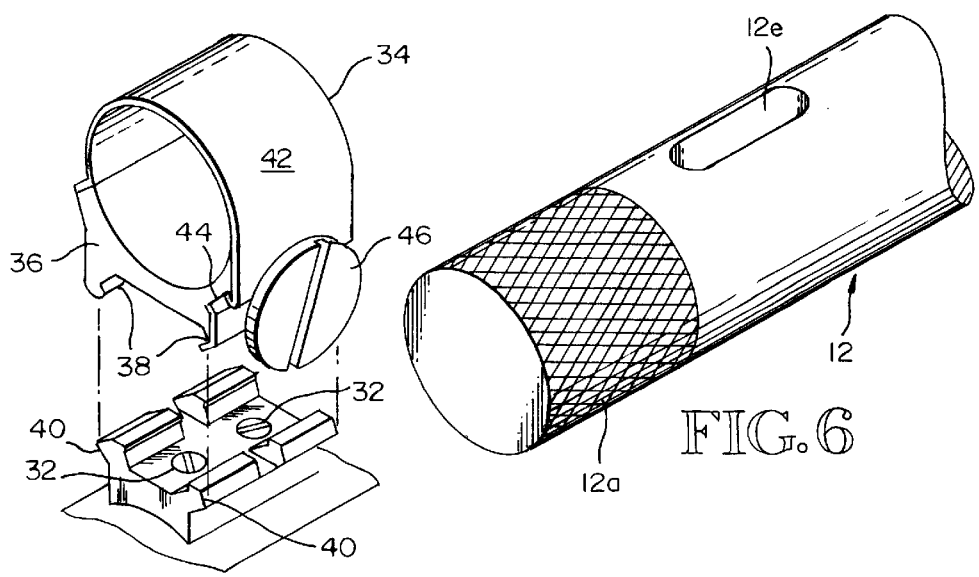
FIG. 6 is a partial view in perspective illustrating the relationship between the base and ring structure of another type of scope mounting assembly that is composed of separate ring-mounting bases that each carry a scope-retaining ring, and further illustrating a part of one of the FIG. 1 aligning bars juxtaposed alongside.
Figure 7:
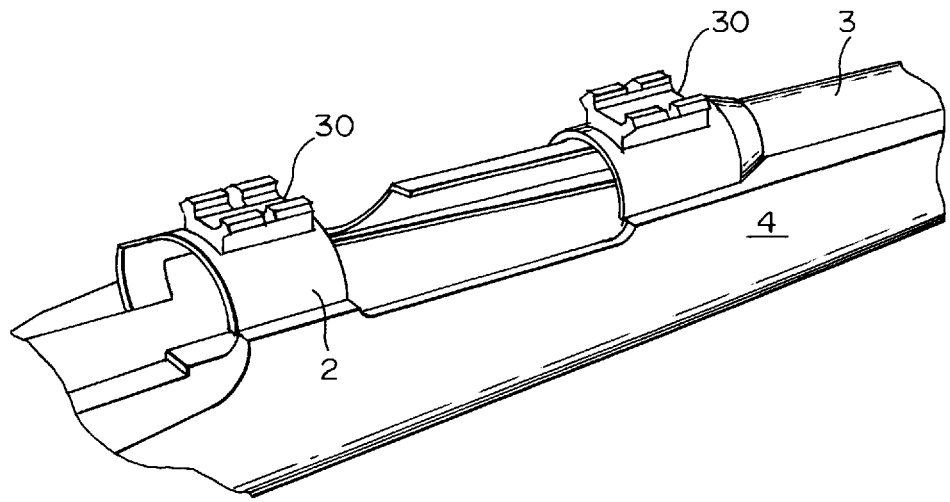
FIG. 7 is a perspective view of the FIG. 6 type of scope mounting assembly bases attached to a rifle receiver.
Figure 9:
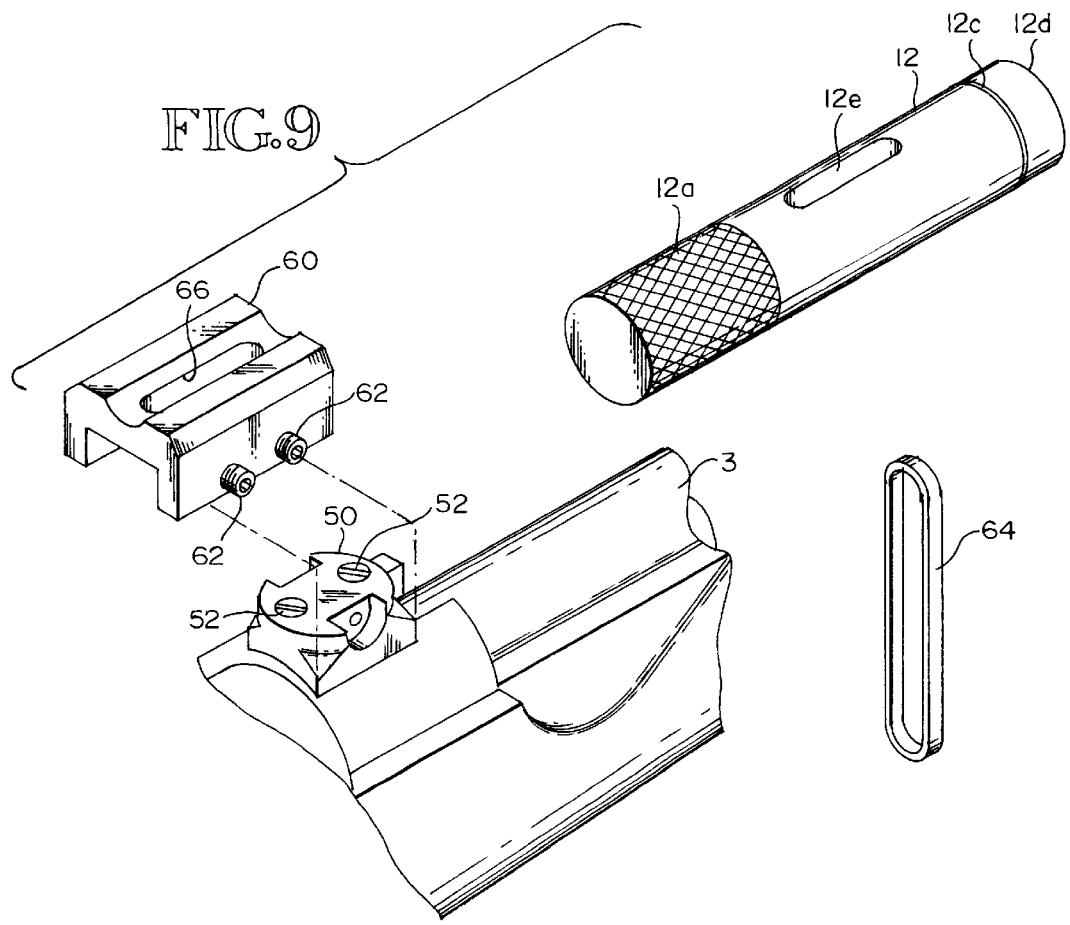
FIG. 9 is a perspective view of an aligning bar adapter juxtaposed to still another type of scope mounting assembly base.

The scope aligning bars 1 of FIG. 1 are useful in aligning a variety of scope-mounting assemblies. One such is shown in FIGS. 2–3, a second is shown in FIGS. 6–7, and a third is shown in FIG. 9. Generally speaking, the available scope-mounting assemblies for mounting a telescopic sight to a rifle or to a hand gun fall into two categories. One scope mounting assembly provides separate fore and aft scope retaining rings that are mounted onto a one-piece base in the form of a bridge-type ring mounting base; the base being attached to the receiver of a rifle, for example as shown in FIG. 1, and bridging the rifle's receiver, providing fore and aft ring seating surfaces. Another scope mounting assembly provides both fore and aft scope retaining rings and a two-piece base composed of fore and aft ring mounting bases; the bases being separately attached to the receiver of a rifle, for example as shown in FIGS. 6 and 7, or in some cases attached to the receiver and to the barrel of the rifle, or to just the barrel, with the fore base providing a fore ring seating surface and the aft base providing an aft ring seating surface.

Figure 4:
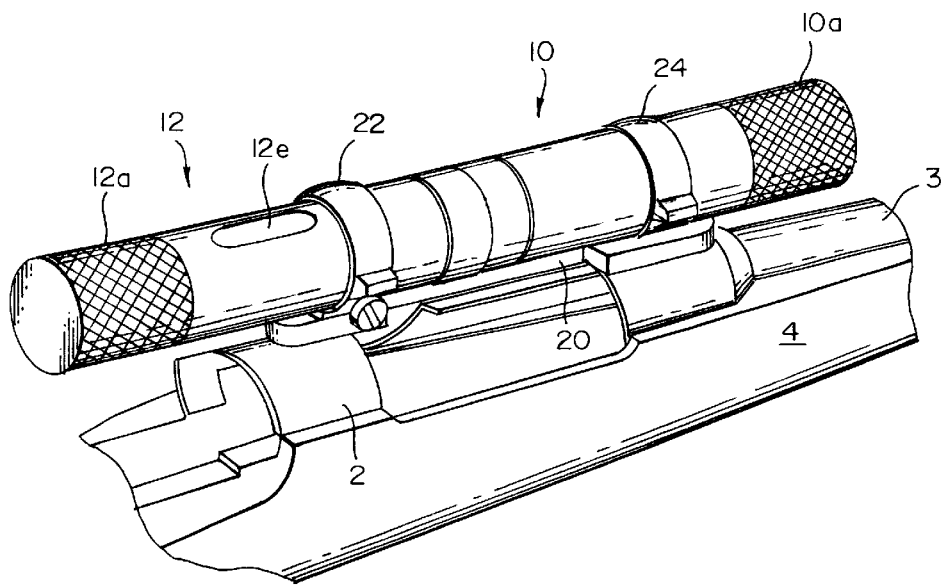
FIG. 4 is a perspective view of the FIG. 2 scope mounting assembly with the FIG. 1 aligning bars applied to align the mounting assembly scope retaining rings.
Figure 5:
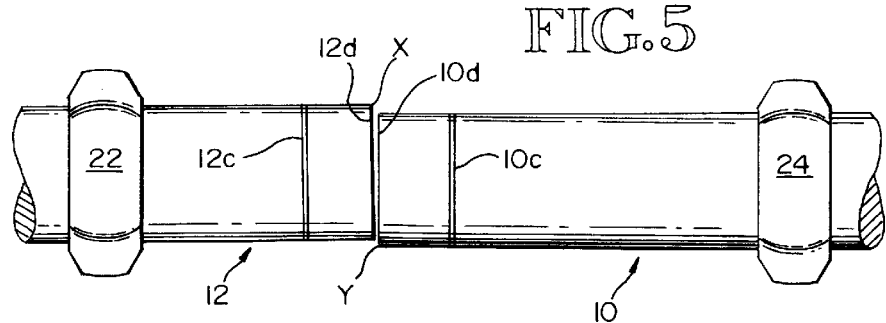
FIG. 5 is a top plan view of the FIG. 4 combination illustrating how the FIG. 1 aligning bars signify that the scope retaining rings are mis-aligned.

In a typical bridge-type scope mounting assembly, as shown in FIGS. 2–3, the bridge-type mounting base 20 is screwed down onto the rifle receiver 2 (see FIG. 3) and is not adjustable relative to the receiver; but one or both of the scope retaining rings 22, 24 are selectively and independently adjustably mounted to the base 20. Typically, both fore and aft rings 22, 24 are adjustable in the base 20, at least to the extent that they can be rotated somewhat in the base 20 so that they may be axially aligned. When properly aligned, a line extended through the center of one of the rings 22, 24 will be coincident with a line extended through the center of the other ring; the rings' inner circumferences being parallel to one another. In this type of scope mounting assembly, an aligning rods 10, 12 is inserted through each ring 22, 24 to the point where the inner end surfaces 10b, 12b almost meet near the midpoint between the two rings as shown in FIG. 4. If the rings 22, 24 are misaligned in any direction, the adjacent ends of the rods 10, 12 will manifest the misalignment as shown in FIG. 5. Whether a misalignment is vertical or horizontal or both, the misalignment will be easily visually perceived as seen in FIG. 5.

For some scope mounting assemblies, the retaining rings are held in position by a friction fit between the rings and the base and in such cases, the aligning rods 10, 12 may be tapped with a hammer to force the rings into proper alignment—such being indicated when the rods 10, 12 are tapped into an alignment where the adjacent inner end surfaces 10b, 12b and the respective outer circular edges 10d, 12d, that define the outer peripheries of surfaces 10b, 12b respectively, are aligned—with the end surfaces 10c, 12c being parallel and with their outer circular peripheral edges 10d, 12d being directly opposite each other. The annular grooves 10c, 12c are provided as demarking lines so that any tapping will be done between the knurled surfaces 10a, 10b and the grooves 10c, 12c; thereby insuring that no tapping will be done to the inner end portions of the bars that might damage the circular peripheral edges 10d, 12d.

Whether a particular bridge-type scope mounting assembly is in or out of alignment, the rods 10, 12 can be used to check or test the assembly's alignment. In the event the bars cannot be lined up, the firearm owner can easily test the mount assembly in various configurations assuming, or course, that some or all of the parts may be interchangeable. For example, if it is possible to reverse the front ring, that might be tried; the rear ring might also be reversed to see if that might correct a misalignment. It is also possible that the rings might be interchanged. Of course, any interchanging of parts or reversal of position is dependent on the design limitations of the particular telescope mount assembly. If the bars still cannot be lined up after exploring all of the various possibilities, the firearm owner should bring the inner end surfaces, 10b, 12b into contact and as closely parallel as possible, disregarding the alignment of the circular peripheral edges 10d, 12d. At this point, the use of a straightedge will quickly reveal the culprit part by placing the straightedge along the side surfaces, the top surfaces, and the surfaces halfway between the top and side as is described in detail under "Redfield-type mount" hereinafter.

Should these tests be beyond the ability of the owner, or the correction of the discovered problem beyond his or her capability, he or she may then elect to take the gun and mounts to a competent gunsmith for evaluation, repair or possible replacement. In some cases, for example, a misalignment might be caused by an incorrect mounting of the base 20, that could not be corrected by altering the attitude of the mounting rings 22, 24, a situation that would ordinarily require correction by a gunsmith.

Another typical scope mounting assembly is commonly known as a "Weaver-type mount" and it is typified in U.S. Pat. No. 2,632,251. This mount, as shown in FIGS. 6 and 7 provides a two-piece base formed of two separate mounting bases 30 that are each screwed down onto the rifle receiver 2 with two vertical screws 32 (see FIG. 6) and are slightly adjustable relative to the receiver. This base provides two separate and identical scope retaining rings 34 (one ring being shown in FIG. 6). Each ring 34 is comprised of a scope cradle 36 that has two lower longitudinal retaining grooves 38 that fit over external longitudinal side ribs 40 on base 30, and a semicylindrical retainer 42. Retainer 42 can be pivoted up and away from the cradle 36, so that a scope can be inserted or removed from the mount, and can be latched over a longitudinal lip 44 on the cradle 36 and clamped onto the cradle 36 by two screws on the side opposite to the lip 44 (not seen in FIG. 6). The clamp screw 46 attaches the ring cradle assembly to the base 30. The rings 34 are not adjustable once they are secured to the bases 30. The bases 30, however, can be slightly adjusted by loosening the screws 32 and shifting the position of the base and then re-tightening the screws to secure the base in the new position.

Figure 8:
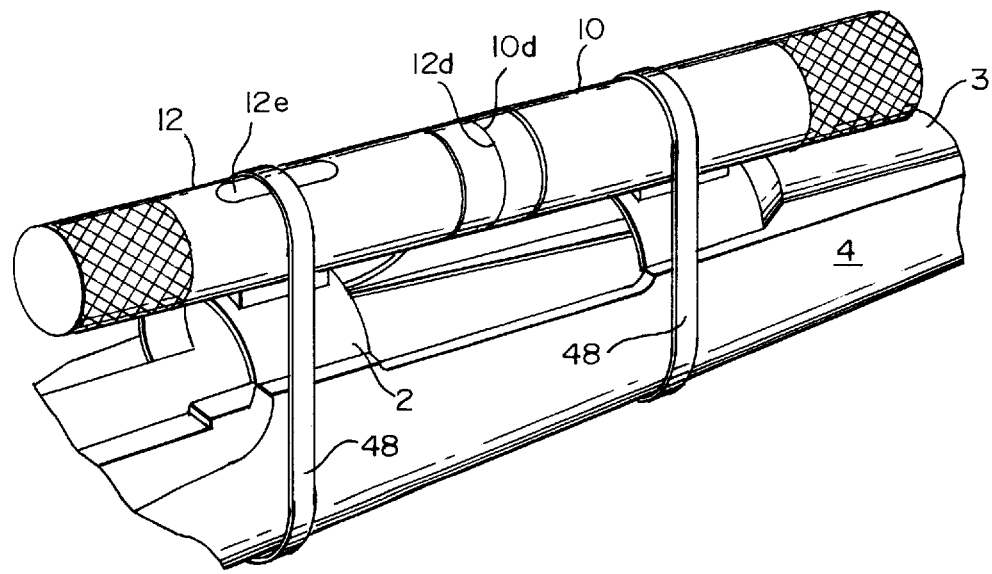
FIG. 8 is a perspective view of the FIG. 1 aligning bars applied to the FIG. 7 mounting assembly bases.

By providing at least one of the scope aligning bars, such as rod 12, with an elongated access slot, such as slot 12e (see FIGS. 6 and 8), that bar can be so positioned on top of the Weaver-type mounting base 30 that the screws 32 are accessible through the access slot. In order to position the rod 12 in this manner, the ring 34 must be removed by slipping the cradle 36 off the base side ribs 40. As a result, the rods 10, 12 must be either held in position manually so that they are centered in the bases 30, or they must be attached by some removable restraint. FIG. 8 illustrates temporarily holding the rods 10, 12 down onto the bases 30 by means of rubber bands 48 that are extended around the bars and the rifle stock 4. The rubber bands 48 must be strong enough to hold the rods 10, 12 firmly onto the bases 30 so that they will be centered in the bases between the base side ribs 40.

As shown in FIG. 8, in this configuration, rod 12 would be located so that its slot 12e would be positioned over the base 30 so that the base screws would be accessible through the slot. If the arrangement shown in FIG. 8 indicated that the base beneath the slot 12e was out of alignment, the user could extend a screw driver through slot 12e and loosen the screws and manipulate the base to a new position where, upon re-tightening the screws, the bars would indicate whether the new position corrected the mis-alignment. And, by reversing the bars so that rod 12 is reset over the other base, that other base can be repositioned also. Of course, both rods 10, 12 could be provided with an appropriate elongated slot, such as slot 12e. However, a more economical set of rods 10, 12 can be produced it just one is provided with the slot; and the inconvenience of having to reverse the bars is not great.

Weaver-type mounts are not as adjustable as the bridge-type mounts. Therefore, it may often be the case that the rods 10, 12 will be used to check or test the alignment of the mounts and not so much used to align the mounts. At this point, if the firearm owner cannot get the bars to line up properly he or she can try interchanging or reversing component parts of the telescope mount assembly. For example, if the bases cannot be brought into proper alignment, placing the rings on the bases and then enclosing the bars within the rings might indicate an improvement in the alignment. It might be possible that an error in one of the bases could be offset by an error in one of the rings. The rings on the Weaver type mount are interchangeable from base to base so that might be tried. Bases are generally not exchangeable because the hole spacing is different, but may be reversed in place. The limitation of this testing is the design of the mount assembly, but all possibilities may readily be tried. Some of the Weaver bases are purposely overheight. An example of this is the rear bases made for Mauser rifles. The rear receiver ring on these rifles is frequently machined or ground to remove the "ears" that hold a stripper clip in position for rapid loading of the rifle in a military combat situation. The "ears" are not needed for sporting purposes and are not cosmetically attractive on a custom rifle, hence their frequent removal. Because the degree of metal removal in this area varies with the individual gunsmith and the condition of the metal itself (possible pitting or rough metal) the rear base is purposely made overheight so that it can be fitted to the height of receiver whatever that height might be. This is usually accomplished by machining the base, but the receiver could also be ground to an elevation to fit the base. In either event, the scope bars when used as shown in FIG. 8, along with a small straightedge along the top surface of the higher elevated bar, can readily reveal any elevation difference down to 0.001" to 0.002", a feeler gauge being used to measure any gap between the lower edge of the straightedge and the upper surface of the lower elevated bar. This, obviously, is work normally done only by a competent gunsmith. Often with a Weaver-type mount, any significant misalignment will require the services of a gunsmith to repair or replace the mounts or perhaps re-drill the screw holes.

Figure 10:
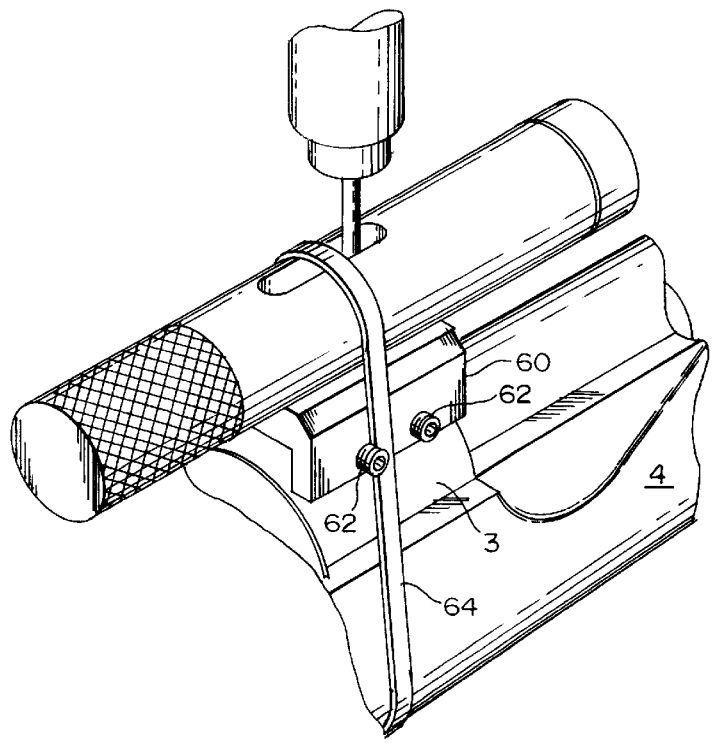
FIG. 10 is a perspective view of one of the FIG. 9 mounting assembly bases with one of the FIG. 1 aligning bars applied to an aligning bar adapter which is in turn applied to the base.

Still another typical scope mounting assembly having a two-piece base is shown in FIG. 9. This mounting assembly, sometimes known as a "Ruger-type mount", provides two separate and identical mounting bases 50 (one being shown in FIGS. 9–10) that are screwed down onto the rifle receiver 2 with two vertical screws 52 (see FIG. 9) and are slightly adjustable relative to the receiver. This base provides two separate scope retaining rings (not shown) that are mounted to one of the bases and held in place by a set screw arrangement. The distinguishing characteristic of the mounting base 50 is that there is no structure by which the rods 10, 12 could be located and centered relative to the bases. Therefore, for these kinds of bases 50, an adapter 60 is provided that can be set over such a base 50 and fastened to the base by means of set screws 62. The adapter 60 is provided with a cradle structure so that one of the bars can be centered and held in position, as by means of a rubber band 64 as shown in FIG. 10. As with the Weaver-type mount, use is made of an elongated slot 12e in rod 12 to gain access to the screws 52 in base 50. In order to enable such access, the adapter 60 must be slotted, as at 66, to match the slot 12e so that a screw drive can be extended through both access slots 12e and 66 down to the base screws 52.

As shown in FIG. 9, in this configuration, rod 12 would be located so that its slot 12e would be positioned over the base 50 so that the base screws would be accessible through the slot. If the arrangement shown in FIG. 9 indicated that the base beneath the slot 12e was out of alignment, the user could extend a screw driver through slot 12e and loosen the screws and manipulate the base to a new position where, upon re-tightening the screws, the bars would indicate whether the new position corrected the mis-alignment. And, by reversing the bars so that rod 12 is reset over the other base, that other base can be repositioned also. Of course, both rods 10, 12 could be provided with an appropriate elongated slot, such as slot 12e. However, a more economical set of rods 10, 12 can be produced if just one is provided with the slot; and the inconvenience of having to reverse the bars is not great. This type of mount is not as adjustable as the bridge-type mounts. Therefore, it may often be the case that the rods 10, 12 will be used to check or test the alignment of the mounts and not so much used to align the mounts. Often with this type of mount, any significant misalignment will require the services of a gunsmith to repair or replace the mounts or re-drill the screw holes. Base elevation differences could readily be detected as previously discussed under "Weaver-type mounts" hereinabove.

The "Redfield-type mount" a bridge-type of mounting base and two separate scope retaining rings. The retaining rings in the Redfield-type mount are formed of a bottom cradle that is secured to the base and a top retainer that is screwed down onto side tabs in the bottom cradle. Typically in a Redfield-type mount, the fore scope ring can be rotated about a vertical axis but the aft ring cannot; and the aft ring can be adjusted from side to side for windage but the fore ring cannot. In this type of mount, the scope aligning bars can be placed in the ring cradles and held therein either by means of the ring retainers or by rubber bands.

Because the inner end surfaces 10b, 12b of rods 10, 12 are perpendicular to the longitudinal axis of the bars and because the inner end portions of the bars are provided with equal diameters, the circular peripheral edges 10d, 12d can be felt with one's finger tips to tactily determine if the bars are aligned, as well as to tactily determine the orientation of any misalignment. Because the peripheries of the bars surrounding the rod inner end surfaces 10b, 12b, as demarked by peripheral edges 10d, 12d, are identical, the laying of a straight edge across both edges 10d, 12d will not only reveal a non-alignment but will also indicate the direction of the non-alignment. For example, the rings 22, 24 may appear aligned when a straight edge is placed across the edges 10d, 12d along the sides of the bars, which would indicate that the rings were aligned lengthwise of the rifle barrel 3; however, the rings might appear mis-aligned when a straight edge is placed across the edges 10d, 12d along the tops of the bars, which would indicate that one or both of the rings were tilted relative to the rifle barrel 3. Furthermore, by placing a straight edge across the edges 10d, 12d midway between the top and sides of the bars, any misalignment resulting from one or both rings being tilted or rotated about vertical and horizontal axis could be detected. This ability to accurately determine where and how a misalignment occurs in one or both rings by using a straight edge is a direct result of the inner end surfaces 10b, 12b and their peripheral edges 10d, 12d being identical. And because they are identical, one who has a fine tactile sense may be able to detect such misalignments to almost the same degree by touch.

Because the bars in use are juxtaposed closely together endwise, as shown in FIGS. 4, 5, 8 and 10 for example, any discrepancy between the two peripheral edges 10d, 12d will cause an applied straight edge to project above one of the bars even though being laid completely in contact with the other bar. The straight edge, in such a condition, may be rocked on the projected one of the edges 10d, 12d (such as 12d at locus "x" or 10d at locus "y" in FIG. 5) with the projected point "x" or "y" serving as a fulcrum. If the bars were not adapted to be positioned with their inner end surfaces closely juxtaposed while being confined in scope rings (as per the FIG. 4 arrangement) or in base cradles (as per the FIG. 8 arrangement) or in base adapter cradles (as per the FIG. 10 arrangement) or in ring cradles (of the Redfield-type mount arrangement), it would be very difficult for one to accurately gauge a misalignment by use of a straight edge and next to impossible by touch.

The scope bars can readily detect minor flaws in component parts of a telescope mounting system as small as a few thousandths of an inch. This is because the errors in any component will manifest themselves at the inner end surfaces of the bars. Those errors are amplified by the ratio of the width of the scope mounting ring to the distance from the scope mounting ring to the inner end of the scope bar. This ratio is usually about 1:4 to 1:5, for each scope bar. The error displayed at 10d or 12d is four to five times the actual error at the scope mounting ring.

Actual hands-on experience shows that errors as small as a few thousandths of an inch on the underside of a bridge-type mount are readily detectable. Many of these bridge-type mounts are actually castings rather than being machined from solid stock and, as such, tiny casting irregularities occur. When these occur on the underside of a bridge-type base they are mated against the top of the rifle receiver when the base is screwed in place. Even a tiny bump will manifest its existence in the scope mount rings. Depending on the bump's position relative to the screws, a slight bending of the base will occur when the screws are tightened. This bending will cause a corresponding tilt in the scope ring, in or out at the top of the scope ring relative to the center of the scope mount assembly, thereby effecting a corresponding downward or upward tilt of the inner end of the scope bar. The four to five times magnification of that tilt at the inner end of the scope bar allows ready detection. Location and removal of the bump would then follow using standard machinist procedures.

While the preferred embodiment of the invention has been described herein, variations in the design may be made. The scope of the invention, therefore, is only to be limited by the claims appended hereto.

The embodiments of the invention in which an exclusive property is claimed are defined as follows:

In the claims:

1. A pair of telescopic sight mount aligning bar means, each bar means comprising an elongated rod having a cylindrical inner end portion with a planar circular inner end bounded by a circular peripheral edge having the same diameter as the diameter of said cylindrical inner end portion, the circular inner ends of the two bar means being perpendicular to the longitudinal axis of their respective rods, and the circular inner ends of the two bar means having substantially identical diameters and peripheral edges so that the two inner ends may be closely juxtaposed when used to align, and to check the alignment of, a telescopic sight mount whereby a telescopic sight mount misalignment will be revealed by a misalignment of said peripheral edges relative to one another with such misalignment being pal- pable to the touch of a user when the two inner ends are closely juxtaposed, and whereby such misalignment also will be revealed by a non-parallelity between said two inner ends.

2. The telescopic sight mount aligning bars of claim 1 wherein said bars are cylinders having substantially uniform and identical diameters.

3. The telescopic sight mount aligning bars of claim 1 wherein said bars are each provided with an outer end that is knurled to provide a finger gripping surface.

4. The telescopic sight mount aligning bars of claim 1 wherein said bars are each provided with an annular groove adjacent to their inner end so as to delineate an end portion that is not to be tapped when adjusting the alignment of a telescopic sight mount.

5. A pair of telescopic sight mount aligning bars, each bar comprising an elongated rod having a planar circular inner end bounded by a circular peripheral edge, the circular inner ends of the two bars being perpendicular to the longitudinal axis of their respective bars, and the inner ends of the two bars having substantially identical diameters and peripheral edges so that the two inner ends may be closely juxtaposed when used to align, and to check the alignment of, a telescopic sight mount whereby a telescopic sight mount misalignment will be revealed by a misalignment of said peripheral edges relative to one another and also will be revealed by a non-parallelity between said two inner ends, at least one of said bars being provided with an elongated access slot extended diametrically through said bar so as to enable access to telescopic sight mount attaching screw that would otherwise be covered by the slotted bar.

6. The telescopic sight mount aligning bars of claim 5 wherein said bars are cylinders having substantially uniform and identical diameters.

7. The telescopic sight mount aligning bars of claim 5 wherein said bars are each provided with an outer end that is knurled to provide a finger gripping surface.

8. The telescopic sight mount aligning bars of claim 5 wherein said bars are each provided with an annular groove adjacent to their inner end so as to delineate an end portion that is not to be tapped when adjusting the alignment of a telescopic sight mount.

9. A pair of telescopic sight mount aligning bars, each bar comprising an elongated rod having a planar circular inner end bounded by a circular peripheral edge, the circular inner ends of the two bars being perpendicular to the longitudinal axis of their respective bars, and the inner ends of the two bars having substantially identical diameters and peripheral edges so that the two inner ends may be closely juxtaposed when used to align, and to check the alignment of, a telescopic sight mount whereby a telescopic sight mount misalignment will be revealed by a misalignment of said peripheral edges relative to one another and also will be revealed by a non-parallelity between said two inner ends; said bars being cylinders having substantially uniform and identical diameters and being each provided with an outer end that is knurled to provide a finger gripping surface; said bars also each being provided with an annular groove adjacent to their inner end so as to delineate an end portion that is not to be tapped when adjusting the alignment of a telescopic sight mount; and at least one of said bars being provided with an elongated access slot extended diametrically through said bar so as to enable access to telescopic sight mount attaching screw that would otherwise be covered by the slotted bar.

* * * * *

(12) EX PARTE REEXAMINATION CERTIFICATE (5580th)
United States Patent
Werre

(10) Number: US 5,813,131 C1
(45) Certificate Issued: Oct. 24, 2006

(54) TELESCOPE MOUNTING ALIGNMENT BARS

(75) Inventor: John D. Werre, 3820 Foothill Rd., Kalispell, MT (US) 59901

(73) Assignee: John D. Werre, Kalispell, MT (US)

Reexamination Request:
No. 90/007,104, Jul. 2, 2004

Reexamination Certificate for:
Patent No.: 5,813,131
Issued: Sep. 29, 1998
Appl. No.: 08/538,279
Filed: Oct. 2, 1995

(51) Int. Cl.
*G01B 5/25* (2006.01)

(52) U.S. Cl. .............................. 33/645; 33/533; 42/125
(58) Field of Classification Search .................. 33/228, 33/412, 502, 520, 533, 567, 567.1, 613, 642, 33/644, 645; 42/1.01, 90, 106, 124, 125, 42/126
See application file for complete search history.

(56) References Cited

U.S. PATENT DOCUMENTS 2,451,904 A 10/1948 Beatty
2,484,801 A 10/1949 Anderson
2,994,131 A 8/1961 Gaylord
4,216,586 A * 8/1980 Long .......................... 33/544.4

OTHER PUBLICATIONS

"Lathe Centering Buttons" from Brownells online catalog as printed from their website www.brownells.com on Apr. 6, 2005, the description and photograph shown for the buttons are pertinent.*
Brownells Catalog No. 46 for 1993–1994, p. 193.
Brownells Catalog No. 46 for 1993–1994, p. 92.

* cited by examiner

*Primary Examiner*—R. Alexander Smith

(57) ABSTRACT

The invention comprises a pair of telescopic sight mount aligning bars. Each bar comprises an elongated rod having a planar circular inner end bounded by a circular peripheral edge. The circular inner ends of the two bars are perpendicular to the longitudinal axis of their respective bars, and the inner ends of the two bars have substantially identical diameters and peripheral edges so that the two inner ends may be closely juxtaposed when used to align, and to check the alignment of, a telescopic sight mount. Consequently, a telescopic sight mount misalignment will be revealed by a misalignment of the peripheral edges relative to one another and also will be revealed by a non-parallelity between the two inner ends.

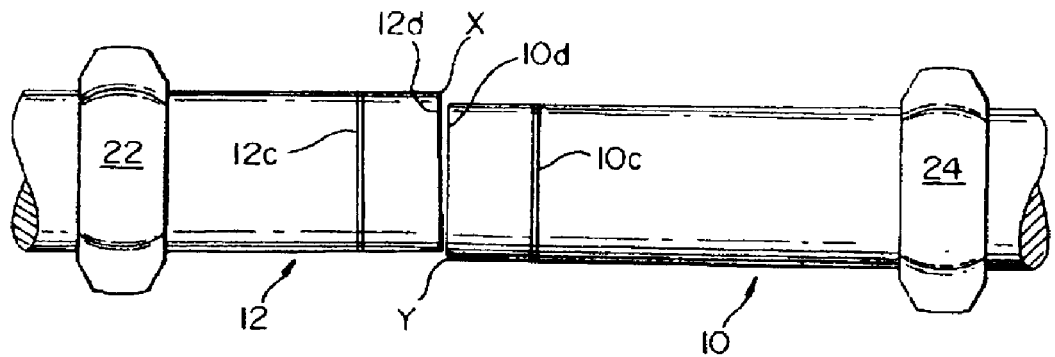

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *